(12) United States Patent
Kumarasamy et al.

(10) Patent No.: US 8,526,447 B1
(45) Date of Patent: Sep. 3, 2013

(54) H.323 TO SIP FAX INTERWORKING

(75) Inventors: Parameswaran Kumarasamy, San Jose, CA (US); Mohammed Taher Shaikh, Fremont, CA (US); Paul Chu, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 1360 days.

(21) Appl. No.: 11/367,662

(22) Filed: Mar. 3, 2006

(51) Int. Cl.
*H04L 12/28* (2006.01)
*H04L 12/56* (2011.01)
*H04J 3/16* (2006.01)
*H04J 3/22* (2006.01)
*H04M 11/00* (2006.01)
*H04N 1/00* (2006.01)

(52) U.S. Cl.
USPC ........ 370/401; 370/466; 370/467; 379/88.13; 379/100.16; 358/407

(58) Field of Classification Search
USPC .............. 370/401, 410, 466–467; 379/88.13, 379/100.1, 902, 905; 358/407
See application file for complete search history.

(56) References Cited

U.S. PATENT DOCUMENTS

| | | | | |
|---|---|---|---|---|
| 2001/0046234 A1* | 11/2001 | Agrawal et al. | ............... | 370/402 |
| 2003/0164986 A1* | 9/2003 | Boire-Lavigne et al. | ...... | 358/400 |
| 2003/0193696 A1* | 10/2003 | Walker et al. | ................. | 358/402 |
| 2005/0021610 A1* | 1/2005 | Bozionek et al. | ............. | 709/203 |
| 2006/0007954 A1* | 1/2006 | Agrawal et al. | ............... | 370/466 |
| 2006/0126605 A1* | 6/2006 | Kajiwara | ...................... | 370/356 |
| 2007/0204065 A1* | 8/2007 | Harton et al. | ................. | 709/246 |

OTHER PUBLICATIONS

Singh/Schulzrinne, Interworking Between SIP/SDP and H.323, Jul. 2000, IETF, pp. 1-36.*
Rosenberg et al., RFC 3261—SIP: Session Initiation Protocol, Jun. 2002.*
ITU-T Recommendation H.323, Jul. 2003.*
ITU-T Recommendation G.711, 1988.*
ITU-T Recommendation T.38—Procedures for real-time Group 3 facsimile communication over IP networks, Sep. 2005.*
ITU-T Recommendation H.245—Control protocol for multimedia communication, Oct. 2005.*
P. Jones et al., Real-Time Facsimile (T.38)—audio/t38 MIME Subtype Registration, Jun. 2004, pp. 1-8.*
International Telecommunication Union, ITU-T, T.38 (Sep. 2005), Series T: Terminals for Telematic Services, Procedures for real-time Group 3 facsimile communication over IP networks (121 pages).
Network Working Group, Request for Comments (RFC): 4123, *Session Initiation Protocol (SIP)—H.323 Interworking Requirements*, Schulzrinne & Agboh, Jul. 2005, http://www.ietf.org/rfc/rfc4123.txt?number=4123.

* cited by examiner

*Primary Examiner* — Un C Cho
*Assistant Examiner* — Jeremy Costin
(74) *Attorney, Agent, or Firm* — Baker Botts L.L.P.

(57) ABSTRACT

A network device has a H.323 interface to communicate under a H.323 standard of the International Telecommunications Union. The device also has a Session Initiation Protocol (SIP) interface. A processor converts signaling messages between H.323 and Session Initiation Protocol to establish a fax session for communication of packetized fax signals and data.

20 Claims, 4 Drawing Sheets

H.323 TO SIP FAX INTERWORKING

BACKGROUND

Interworking refers to the practice of connecting networks together. The term can refer to products, procedures, and technologies. Interworking as used here will refer to connecting networks together using different protocols, such as the International Telecommunications Union (ITU) recommendation H.323, "Packet-based multimedia communications systems," (2003) and Session Initiation Protocol (SIP). SIP is an Internet Engineering Task Force (IETF) standard for initiating, modifying, and terminating an interactive user session that involves multimedia elements such as video, voice, instant messaging, online games, and virtual reality. SIP is set forth in the IETF Request for Comment (RFC) 3261, "Session Initiation Protocol," (June 2002).

The IETF has a standard, RFC 4123, "H.323-SIP Interworking," for interworking between these two protocols. This standard provides basic connections, but does not provide for fax connections in H.323, such as ITU's, "Procedures for real-time Group 3 facsimile communication over IP networks." Generally, Group 3 facsimile communications use run-length encoding with a resolution 203×98 dots per inch, or 203×196 dpi for an 8½ inch by 11 inch document.

SUMMARY

One embodiment is a network device having an H.323 interface to communicate under a H.323 standard of the International Telecommunications Union. The device also has a Session Initiation Protocol (SIP) interface. A processor converts signaling messages between H.323 and Session Initiation Protocol to establish a fax session for communication of packetized fax signals.

Another embodiment is a method of establishing a fax session. A voice call is established between an H.323 endpoint and a SIP endpoint. A fax session is then established by conversion of signaling messages between H.323 and SIP for communication of packetized fax signals.

DETAILED DESCRIPTION OF THE EXEMPLARY EMBODIMENTS

Figure 1:
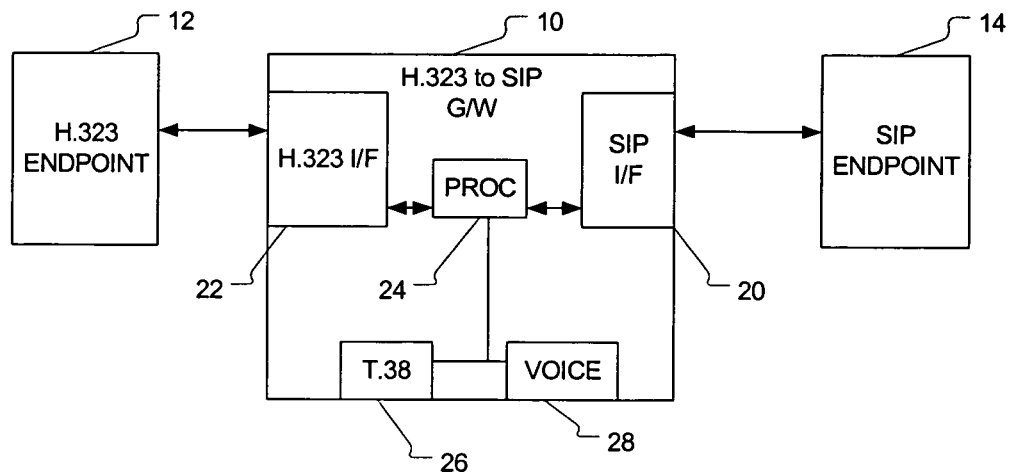
FIG. 1 shows an embodiment of an H.323-SIP network device in a network.

FIG. 1 shows an embodiment of an H.323-SIP network device in a network between a SIP endpoint and a H.323 endpoint. The network device in this instance is an Internet Protocol to Internet Protocol device (IP-IP device), or, more generally, a data network to data network device, with Internet Protocol being an example of a data network. Data networks may be used to transmit voice signals as data packets, and these networks may be referred to as voice networks. In further discussion, Internet Protocol may be used as an example, but with not any intention of limiting the scope of the application of the invention.

A device between a public switch telephone network (PSTN) and a data network, such as the Internet, is a PSTN-IP gateway. A device may also be between two data networks, such as an IP-IP network device. In the discussion here, the network devices of interest are IP-IP network devices, and more particularly, an H.323 to a SIP network device. These devices may also be referred to as session border controllers (SBC), as they control the session at borders of the network.

While H.323 to SIP network devices have been specified and documented with regard to basic connections, there is currently no facility for facsimile transmissions, as mentioned above. Facsimile transmissions are generally defined by groups. For example, Group 3 is a fax standard for 203 by 98 dots per inch (dpi), or 203 by 196 dpi, transmitted at 20 seconds per page. The ITU standard for fax transmission is generally referred to as T.38, referring to the ITU standard T.38, "Procedures for Real-Time Group 3 Facsimile Communications over IP Networks," (September 2005). While this implies that the embodiments of the invention only apply to Group 3, no such intention is intended. Embodiments of this invention apply to all fax communications over data networks.

In FIG. 1, the network device 10 has a SIP interface 20 and a H.323 interface 22. At least one processor, 24, operates to convert data between the SIP endpoint 14 and the H.323 endpoint 12. The translation between the data streams allows data packets formatted and created under one protocol to be converted to data packets under the other protocol. In discussions here, signaling fax messages to establish the communication session are differentiated from the actual fax media or data. The signaling messages are converted between the two protocols to establish the session at which point the fax data or media are exchanged.

The network device may also have several different coder/decoders (codecs) 26 and 28, such as T.38 codec for fax and G.711 codec for voice, among others. The voice codecs convert the incoming voice waveforms signals into packetized data for transmission across the packet network. G.711 codecs, which are codecs operating in accordance with the ITU standard G.711, "Pulse Code Modulation of Voice Frequencies," (November 1988), convert speech effectively without compression at 64 kilobits per second (kbps). Other voice codecs may also reside in the network device, such as a G.729, G.728 and other codecs operating under the appropriate ITU standard.

In fax relay mode, generally the fax-specific codecs will transmit the packetized fax data, in most cases the T.38 codecs. As will be discussed further, in some instances, the fax signals will be packetized by the voice codecs because a fax-specific codec may not be available. If a voice codec is to be used for fax signals, a lower level of compression will result in a higher quality fax. For example, using a G.711 codec with 64 kbps transmission would result in a higher quality fax than a G.729 codec that has only 8 kbps. This makes G.729 codecs unsuitable for fax communications. However, as mentioned above, typically fax sessions involve the fax codecs.

Figure 2:
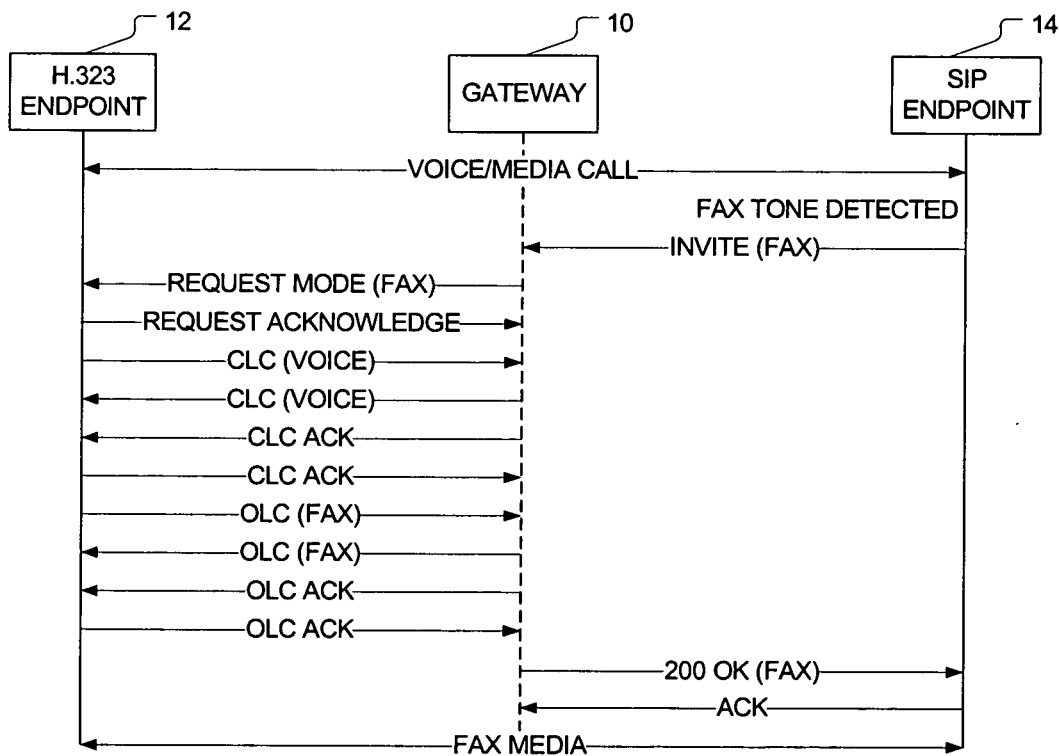
FIG. 2 shows an embodiment of a method of establishing an H.323-SIP fax session when fax tone is detected on the SIP side.

An embodiment of a method of establishing a fax session in a H.323 to SIP gateway or SBC is shown in FIG. 2. It must be noted that the fax invite message discussed below is a fax invite under T.38, and the Request Mode and Request Acknowledge messages are referred to as being under H.245, an ITU standard, "Control Protocol for Multimedia Communication," (October 2005). However, these messages may be more general than that, such as those that may be included in successive or replacement protocols to T.38 or H.245. For that reason, the T.38 fax invite message discussed above will be referred to as a more general fax invite message, and the Request Mode and Request Acknowledge messages will be referred to more generally as mode request and mode acknowledgement messages. Similarly, the 200 OK message may be referred to as a processing complete message, and the acknowledge messages as an acknowledgement.

In this embodiment, a voice or media call is established between the two endpoints. Even if the intention of the call is to transmit a fax, the voice call is established first. During voice call establishment, the gateway 10 will send out messages in accordance with H.245. These messages include Terminal Capability Set (TCS), master slave determination (MSD) and Open Logical Channel (OLC). The gateway will include the T.38 capability in its outgoing messages, which will allow the switch from voice to fax. The embodiment of FIG. 2 is for a situation in which the fax tone is detected at the SIP endpoint.

When the fax tone is detected at the SIP endpoint, a T.38 or fax invite message is transmitted to the gateway 10. The fax invite may include the network address and T.38 port being used for transmission between the SIP endpoint and the gateway. From the position of the SIP endpoint, the fax session is between the SIP endpoint and the gateway, with the gateway terminating the session. This mode of operation, where the media passes through the IP-IP gateway, is referred to as flow-through mode.

As the H.323 endpoint will not recognize the fax invite message, the gateway 10 converts that to a message that the H.323 endpoint will recognize. The Request Mode message under H.245 is used by a receiving terminal to request particular modes of transmission from the transmitting terminal.

Upon reception of the mode request from the gateway, the H.323 endpoint will respond with a Request Acknowledge message to confirm that the transmit terminal will transmit in the mode requested. The H.323 endpoint and the gateway then close the logical channel (CLC) for voice with the corresponding acknowledgement (CLC ACK) and open the logical channel (OLC) for fax with the corresponding acknowledgement (OLC ACK). The OLC message may include the IP address and Real-Time Transport Protocol Control Protocol (RTCP) port for the session between the H.323 endpoint and the gateway, and the OLC ACK message may include the IP address, Real-Time Transport Protocol (RTP) port and RTCP ports. The H.323 endpoint does not 'see' the IP address and ports of the SIP endpoint, rather only the network (IP) address and ports of the H.323-SIP gateway.

Upon the opening of the logical channel for fax, the gateway 10 then transmits a "200 OK" message to the SIP endpoint that indicates that the request has been successfully processed along with the network address and port used for fax communication. This is followed by a fax acknowledge message from the SIP endpoint to the gateway. The fax call is now established. In the fax relay mode, the fax codecs packetize the fax signal and data, which are transmitted by the processor to the other gateway. Alternative modes will be discussed below.

Figure 3:
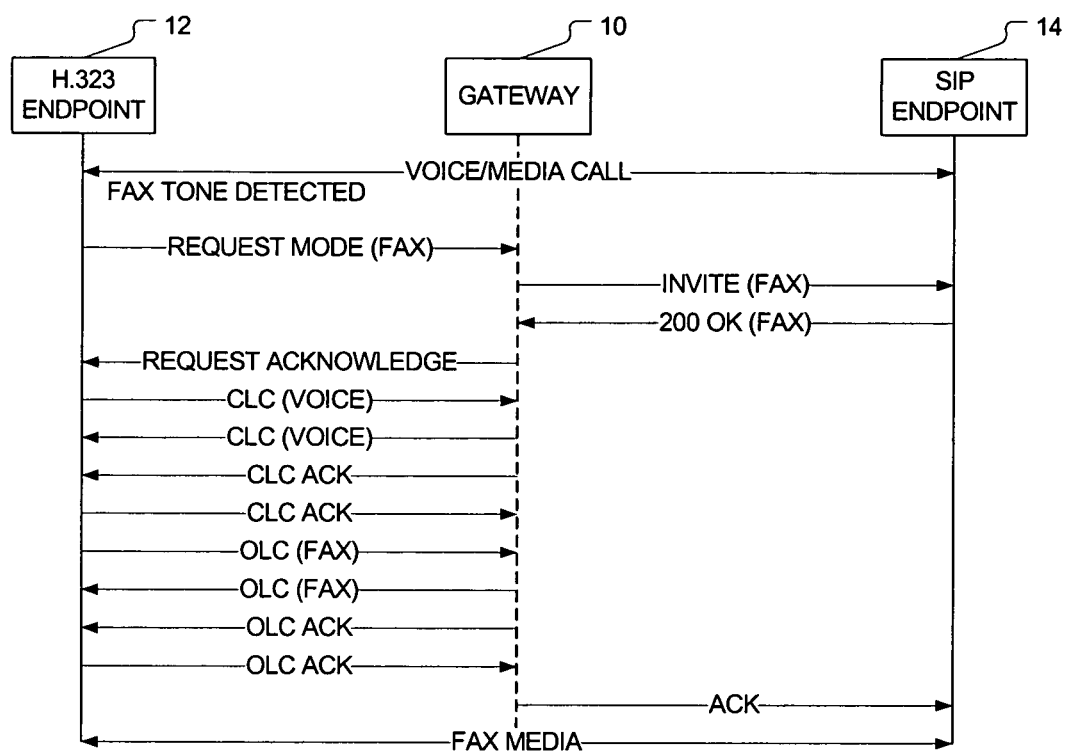
FIG. 3 shows an alternative embodiment of a method of establishing an H.323-SIP fax session when fax tone is detected on the H.323 side.

An alternative embodiment of a method of establishing a fax session is shown in FIG. 3. In FIG. 3, the voice call is established prior to a fax tone being detected at the H.323 endpoint. As discussed above with regard to FIG. 2, the gateway will transmit messages including its T.38 capability, enabling the transition from voice to fax and fax to voice.

Upon detection of the fax tone, the H.323 endpoint sends the Request Mode message. When the gateway receives the Request Mode message, it transmits the fax invite message to the SIP endpoint.

The SIP endpoint responds with the 200 OK message. The gateway then sends the Request Acknowledge message to the H.323 endpoint. The voice channel is then closed by the CLC and CLC ACK messages, and the OLC and OLC ACK messages open the fax channel. Upon receiving OLC ACK message, the gateway responds to the SIP endpoint with Acknowledge. The fax call is then established.

The fax call may be ended by the gateway upon detection of a fax end. Ending the fax call may involve disconnecting the call, or switching back to the voice call, depending upon the situation. In either case, the fax call will be referred to as being 'ended.'

Figure 4:
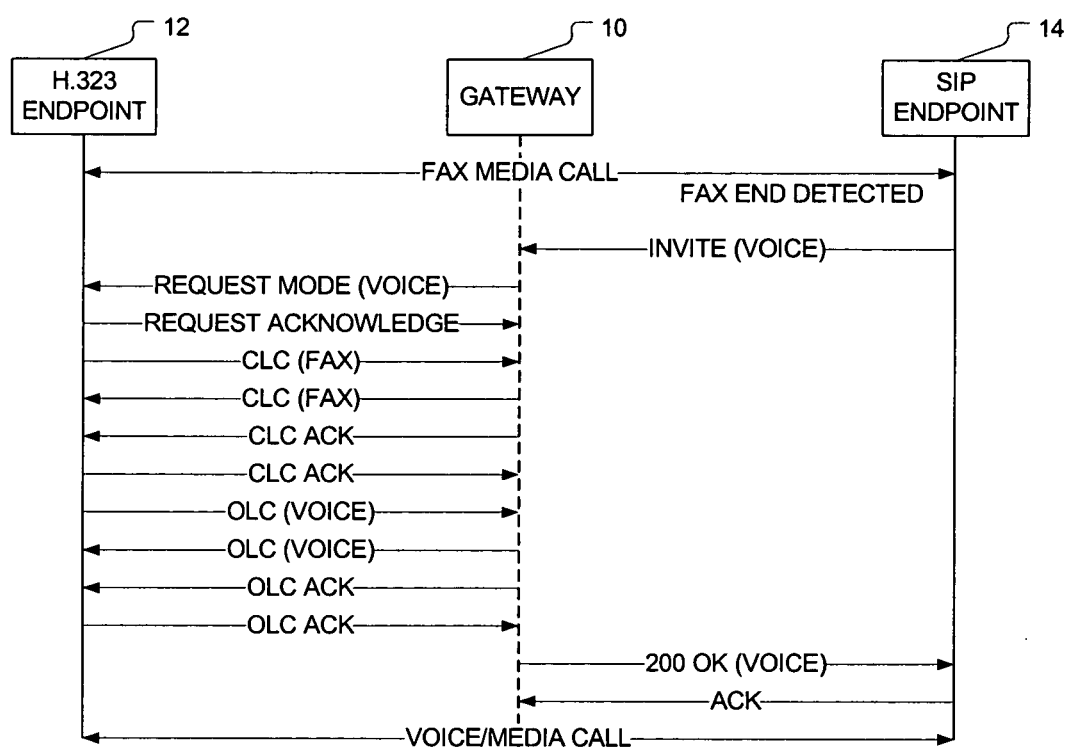
FIG. 4 shows an embodiment of a method of ending an H.323-SIP fax session when fax end is detected on the SIP side.

To end the fax call by switching back to a voice call, a reverse process occurs. An embodiment of such a process is shown in FIG. 4. When the fax transmission ends, for example, at the SIP endpoint, the SIP endpoint transmits an invite message for the voice call. The invite message for the voice call will include the voice codec information, instead of the fax codec. The process then continues for the voice call, with information related to the voice codec, IP address and voice media ports, etc., instead of the fax codec.

The gateway reacts to the voice invite by transmission of a Request Mode message with voice codec to the H.323 endpoint, receiving a Request Acknowledge in reply. The logical channel for the fax is then closed by the CLC and CLC ACK messages and the logical channel opened for voice by the OLC and OLC ACK messages.

The gateway then responds to the SIP endpoint with a 200 OK for the voice call, followed by the Acknowledge message from the SIP endpoint. The voice call is then established, switching the stream from the fax stream to the voice stream for the H.323-SIP session. The voice codecs are then responsible for packetizing the voice waveforms for transmission by the processor.

Figure 5:
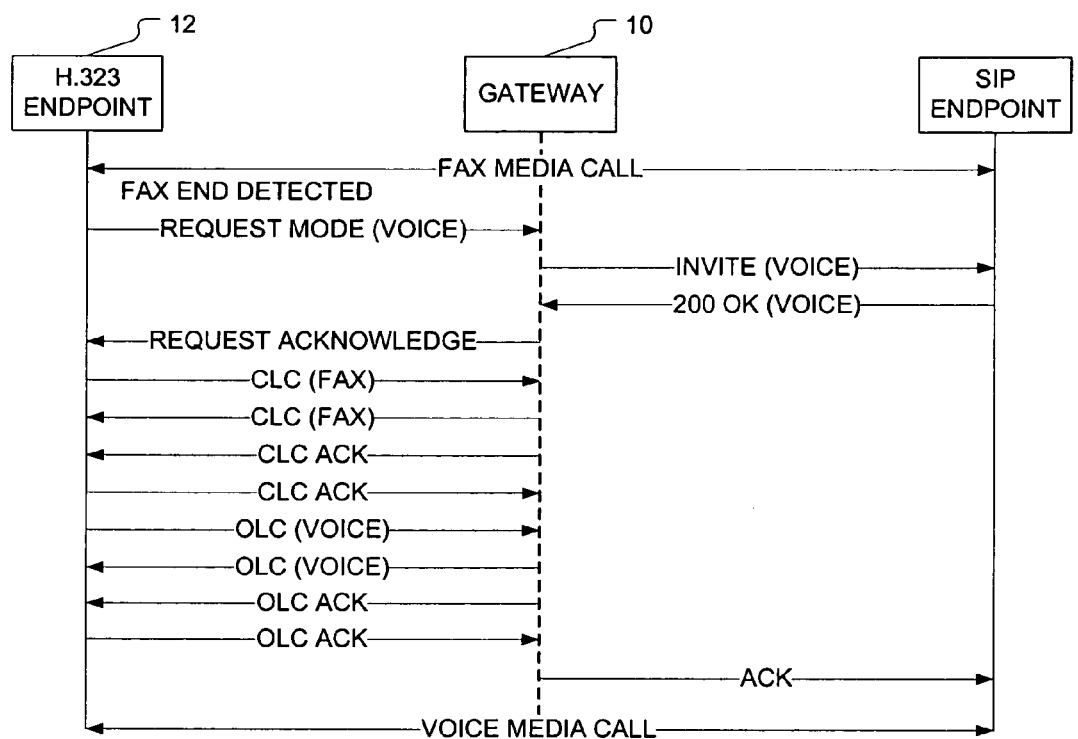
FIG. 5 shows an embodiment of a method of ending an H.323-SIP fax session when fax end is detected on the H.323 side.

FIG. 5 shows an embodiment of a method of ending the fax call by switching back to the voice call when the fax end is detected at the H.323 endpoint. Upon detection of the fax end at the H.323 endpoint, the H.323 endpoint transmits a mode request for voice to the gateway. The gateway then translates this to a fax invite message to the SIP endpoint.

Upon reception of the 200 OK message from the SIP endpoint, the gateway transmits an acknowledge mode to the H.323 endpoint. The gateway and the H.323 endpoint then close the logical channel for fax with an exchange of CLC (FAX) messages with corresponding CLC ACK messages. The logical channel for voice is then opened with an exchange of OLC (VOICE) messages and the corresponding acknowledgements (OLC ACK).

After receiving the OLC ACK from the H.323 endpoint, the gateway transmits a final acknowledgement to the SIP endpoint. The voice media call is then established and the voice media exchange can begin.

It must be noted that the above call flows assume that the gateway is operating in a fax relay mode, where the fax session is established between fax machines over IP network with the help of the fax aware codec. The fax aware codec detects fax specific signals and transmit or relays over IP network effectively. Other modes of operation are also possible.

In a fax pass-through mode, the above call flows remain the same, but the codec information exchanged is not for the T.38 codecs, but for the G.711 codecs which will treat fax signals and data, just like voice stream. As discussed above, in some instances a fax-specific codec may not be available. The fax signals will be packetized by the G.711 codec for transmission.

H.323-SIP gateway supports two types of media support. One is called as media flow-through and another is called as media flow-around. In flow-through mode, both signaling and media are terminated and reoriginated at H.323-SIP gateway. The end points do not see each other's address, instead they see only H.323-SIP gateway address.

In flow-around mode, the signaling is terminated and reoriginated at H.323-SIP gateway but media flows directly between end points. It does not get terminated and reoriginated at H.323-SIP gateway, so the gateway address is not used.

In this manner, fax transmissions may be achieved in a H.323 to SIP interworking environment. The network device need not be a new network device. Existing H.323 to SIP gateways may already exist that may be upgraded to have the functionality set out above. For example, an existing gateway or SBC may be upgraded with a new version of software contained on an article of computer-readable media, or in a new ASIC or other programmable logic device. In this instance, the embodiment of the invention may be logic encoded on one or more media for execution and when executed would be operable to perform the methods of the invention as discussed above.

Thus, although there has been described to this point a particular embodiment for a method and apparatus for fax relay in an H.323 to SIP interworking environment, it is not intended that such specific references be considered as limitations upon the scope of this invention except in-so-far as set forth in the following claims.

What is claimed is:

1. A device for fax interworking, the device comprising:
   an H.323 interface;
   a Session Initiation Protocol (SIP) interface; and
   a processor operable to:
      establish a voice call between an H.323 endpoint and a SIP endpoint;
      transmit a fax mode request message to the H.323 endpoint through the H.323 interface in response to receiving a fax invite message from the SIP endpoint through the SIP interface;
      close any open logical channels for voice between the H.323 endpoint;
      open a logical channel for fax between the H.323 endpoint by exchanging messages with the H.323 endpoint, the messages comprising an Internet Protocol (IP) address and a Real-Time Transport Protocol Control Protocol (RTCP) port;
      establish a fax call between the H.323 endpoint and the SIP endpoint after opening the logical channel for fax; and
      end the fax call by switching back to the voice call, wherein switching back to the voice call comprises:
         transmitting a voice mode request message to the H.323 endpoint through the H.323 interface in response to receiving a voice invite message from the SIP endpoint through the SIP interface;
         closing the logical channel for fax between the H.323 endpoint; and
         opening a logical channel for voice between the H.323 endpoint.

2. The device of claim 1, wherein the processor is further operable to process fax media and voice media in a media flow-through mode.

3. The device of claim 1, wherein the processor is further operable to process only signaling messages in a media flow-around mode.

4. A method of fax interworking, the method comprising:
   establishing a voice call between an H.323 endpoint and a Session Initiation Protocol (SIP) endpoint;
   transmitting a fax mode request message to the H.323 endpoint through an H.323 interface in response to receiving a fax invite message from the SIP endpoint through SIP interface;
   closing any open logical channels for voice between the H.323 endpoint; opening a logical channel for fax between the H.323 endpoint by exchanging messages with the H.323 endpoint, the messages comprising an Internet Protocol (IP) address and a Real-Time Transport Protocol Control Protocol (RTCP) port;
   communicating packetized fax media via a fax call between the H.323 endpoint and the SIP endpoint; and
   ending the fax call by switching back to the voice call, wherein switching back to the voice call comprises:
   transmitting a voice mode request message to the H.323 endpoint through the H.323 interface in response to receiving a voice invite message from the SIP endpoint through the SIP interface;
   closing the logical channel for fax between the H.323 endpoint; and
   opening a logical channel for voice between the H.323 endpoint.

5. The method of claim 4, wherein the fax invite messages is a T.38 fax invite message in accordance with an ITU standard T.38, September, 2005.

6. The method of claim 4, wherein the fax mode request messages is a H.245 request mode messages in accordance with ITU standard H.245, October, 2005.

7. A device for fax interworking, the device comprising:
   means for interfacing according to H.323;
   means for interfacing according to Session Initiation Protocol (SIP);
   means for establishing a voice call between an H.323 endpoint and a SIP endpoint;
   means for transmitting a fax mode request message to the H.323 endpoint, by way of the means for interfacing according to H.323, in response to receiving a fax invite message from the SIP endpoint, by way of the means for interfacing according to SIP;
   means for closing any open logical channels for voice between the H.323 endpoint;
   means for opening a logical channel for fax between the H.323 endpoint by exchanging messages with the H.323 endpoint, the messages comprising an Internet Protocol (IP) address and a Real-Time Transport Protocol Control Protocol (RTCP) port;
   means for establishing a fax call between the H.323 endpoint and the SIP endpoint after opening the logical channel for fax; and
   means for ending the fax call by switching back to the voice call, wherein switching back to the voice call comprises:
      transmitting a voice mode request message to the H.323 endpoint through the H.323 interface in response to receiving a voice invite message from the SIP endpoint through the SIP interface;
      closing the logical channel for fax between the H.323 endpoint; and
      opening a logical channel for voice between the H.323 endpoint.

8. A non-transitory computer-readable media including code that, when executed on a computer, causes the computer to:
- establish a voice call between an H.323 endpoint and a Session Initiation Protocol (SIP) endpoint;
- transmit a fax mode request message to the H.323 endpoint through an H.323 interface in response to receiving a fax invite message from the SIP endpoint through SIP interface;
- close any open logical channels for voice between the H.323 endpoint;
- open a logical channel for fax between the H.323 endpoint by exchanging messages with the H.323 endpoint, the messages comprising an Internet Protocol (IP) address and a Real-Time Transport Protocol Control Protocol (RTCP) port; and
- communicate packetized fax media via a fax call between the H.323 endpoint and the SIP endpoint; and
- end the fax call by switching back to the voice call, wherein switching back to the voice call comprises:
- transmitting a voice mode request message to the H.323 endpoint through the H.323 interface in response to receiving a voice invite message from the SIP endpoint through the SIP interface;
- closing the logical channel for fax between the H.323 endpoint; and
- opening a logical channel for voice between the H.323 endpoint.

9. The non-transitory computer-readable media of claim 8, the non-transitory computer-readable media further including code that, when executed on the computer, causes the computer to end the fax call by disconnecting the fax call.

10. The device of claim 1, wherein the processor is further operable to:
- receive a processing complete message through the SIP interface; and
- transmit a fax mode acknowledgment message though the H.323 interface.

11. The device of claim 10, wherein the processor is further operable to:
- transmit an acknowledgment message associated with the processing complete message through the SIP interface after closing the logical channels for voice and opening the logical channel for fax.

12. The device of claim 1, wherein the processor is further operable to:
- transmit a voice mode request message through the H.323 interface in response to receiving a voice invite message through the SIP interface.

13. The device of claim 1, wherein the processor is further operable to:
- transmit a voice invite message through the SIP interface in response to receiving a voice mode request message through the H.323 interface.

14. The device of claim 1, wherein the processor is further operable to end the fax call by disconnecting the fax call.

15. The device of claim 7 further comprising: means for disconnecting the fax call.

16. The device of claim 1, wherein the fax invite message is a T.38 fax invite message in accordance with ITU standard T.38, September, 2005.

17. The device of claim 1, wherein the fax mode request message is an H.245 request mode message in accordance with ITU standard H.245, October, 2005.

18. The method of claim 4, further comprising ending the fax call by disconnecting the fax call.

19. The non-transitory computer-readable media of claim 8, wherein the fax invite message is a T.38 fax invite message in accordance with ITU standard T.38, September, 2005.

20. The non-transitory computer-readable media of claim 8, wherein the fax mode request message is an H.245 request mode message in accordance with ITU standard H.245, October, 2005.

* * * * *